(12) United States Patent
Cheong et al.

(10) Patent No.: US 8,824,441 B2
(45) Date of Patent: Sep. 2, 2014

(54) METHOD FOR TRANSMITTING DATA FRAME IN WIRELESS LOCAL AREA NETWORK AND APPARATUS FOR THE SAME

(75) Inventors: Min Ho Cheong, Daejeon-si (KR); Sok Kyu Lee, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/470,202

(22) Filed: May 11, 2012

(65) Prior Publication Data

US 2012/0287915 A1 Nov. 15, 2012

(30) Foreign Application Priority Data

May 12, 2011 (KR) .................. 10-2011-0044805
May 11, 2012 (KR) .................. 10-2012-0050431

(51) Int. Cl.
*H04W 84/12* (2009.01)
(52) U.S. Cl.
USPC .......................................... 370/338
(58) Field of Classification Search
USPC ......... 370/328, 252, 310, 338, 349, 389, 470, 370/472, 506; 455/561
See application file for complete search history.

(56) References Cited

U.S. PATENT DOCUMENTS

| 2006/0189352 A1* | 8/2006 | Nagai et al. .................. 455/561 |
| 2010/0232411 A1 | 9/2010 | Trachewsky et al. |
| 2011/0299468 A1* | 12/2011 | Van Nee et al. ............... 370/328 |
| 2012/0039198 A1* | 2/2012 | Yang et al. .................... 370/252 |
| 2012/0207035 A1* | 8/2012 | Simha et al. .................. 370/252 |

FOREIGN PATENT DOCUMENTS

| EP | 1603277 A1 | 12/2005 |
| JP | 2007-215244 A | 8/2007 |
| KR | 10-2011-0030423 A | 3/2011 |

OTHER PUBLICATIONS

LAN/MAN Standard Commttee of the IEEE computer society, Wireless LAN Medium Access Control (MAC) and Physical Layer (PHY) specifications High speed physical Layer in the 5 GHz band (IEEE Std. 802.11a-1999), 1999,IEEE computer society, Part 11, 1 through 83.*

* cited by examiner

*Primary Examiner* — Obaidul Huq
*Assistant Examiner* — Syed M Bokhari

(57) ABSTRACT

A wireless device of transmitting a data frame in a WLAN is provided. The wireless device includes: a MAC unit generating a data frame; a PHY unit transmitting a wireless signal of the data frame; and a processor being operably coupled to the MAC unit and the PHY unit and controlling a set of TXVECTOR parameters. The processor is configured for: generating the data frame, the data frame including a data field having a service field and a very high throughput signal information (VHT-SIG-B); and transmitting a wireless signal of the data frame via a operating channel bandwidth. The data field is scrambled with a scrambling sequence, the scrambling sequence is generated based on a initial scrambling sequence and a generator polynomial. The service field is determined based on the set of TXVECTOR parameters, the TXVECTOR parameters including an control information for the service field.

14 Claims, 9 Drawing Sheets

FIG. 7

| PARAMETER | CONDITION | INITIAL SCRAMBLING SEQUENCE (FIRST 7 BITS OF SCRAMBLING SEQUENCE) ||||||| 
| | | B0 | B1 | B2 | B3 | B4 | B5 | B6 |
| | | | | | | TRANSMISSION ORDER → ||||
| TXVECTOR | BANDWIDTH INDICATION INFORMATION PARAMETER IS PRESENT DYNAMIC BANDWIDTH INDICATION INFORMATION PARAMETER IS NOT PRESENT | -IN THE CASE IN WHICH BANDWIDTH INDICATION INFORMATION PARAMETER INDICATES CBW20: 5 BIT PSEUDO RANDOM NON-ZERO INTEGER -OTHERWISE: 5 BIT PSEUDO RANDOM INTEGER |||||SET VALUE OF BANDWIDTH INDICATION INFORMATION PARAMETER ||
| TXVECTOR | BANDWIDTH INDICATION INFORMATION PARAMETER AND DYNAMIC BANDWIDTH INDICATION INFORMATION PARAMETER ARE PRESENT | -IN THE CASE IN WHICH BANDWIDTH INDICATION INFORMATION PARAMETER INDICATES CBW20 AND DYNAMIC BANDWIDTH INDICATION INFORMATION PARAMETER INDICATES 'STATIC': 4 BIT PSEUDO RANDOM NON-ZERO INTEGER -OTHERWISE: 4 BIT PSEUDO RANDOM INTEGER |||| SET VALUE OF DYNAMIC BANDWIDTH INDICATION INFORMATION PARAMETER | SET VALUE OF BANDWIDTH INDICATION INFORMATION PARAMETER ||

METHOD FOR TRANSMITTING DATA FRAME IN WIRELESS LOCAL AREA NETWORK AND APPARATUS FOR THE SAME

CROSS-REFERENCE TO RELATED APPLICATIONS

This application claims the benefit of priority of Korean Patent Applications No. 10-2011-0044805 filed on May 12, 2011, and No. 10-2012-0050431 filed on May 11, 2012, all of which are incorporated by reference in their entirety herein.

BACKGROUND OF THE INVENTION

1. Field of the Invention

The present invention relates to a wireless local area network (WLAN) system, and more particularly, to a method for transmitting a data frame by a sender in a WLAN system and an apparatus for supporting the same.

2. Related Art

Recently, various wireless communication technologies are under development in accordance with the advancement of an information communication technology. Among them, a wireless local area network (WLAN) is a technique of wirelessly accessing the Internet at homes, in offices, or in a particular service providing area, using portable terminals such as personal digital assistants (PDAs), lap top computers, portable multimedia players (PMPs), and the like, based on a radio frequency technology.

As a technology specification that has been relatively recently legislated in order to overcome a limitation in a communication speed that has been pointed out as a weak point in the WLAN, there is the IEEE 802.11n. An object of the IEEE 802.11n is to increase a speed and reliability of a wireless network and extend an operating distance of the wireless network. More specifically, the IEEE 802.11n is based on a multiple input and multiple output (MIMO) technology in which multiple antennas are used at both of a transmit end and a receive end in order to support a high throughput (HT) having a maximum data processing speed of 540 Mbps or more, minimize a transmission error, and optimize a data rate.

As the supply of the WLAN is activated and applications using the WLAN is diversified, the necessity for a new WLAN system for supporting a throughput higher than a data processing speed supported by the IEEE 802.11n has recently increased. The next generation WLAN system supporting a very high throughput (VHT) is the next version of the IEEE 802.11n WLAN system and is one of the IEEE 802.11 WLAN systems that have been newly suggested recently in order to support a data processing speed of 1 Gbps or more in a MAC service access point (SAP).

The next generation WLAN system supports transmission in a multi-user multiple input multiple output (MU-MIMO) scheme in which a plurality of non-AP STAs simultaneously accesses wireless channels in order to efficiently use the wireless channels. According to the MU-MIMO transmission scheme, an AP may simultaneously transmit frames to one or more MIMO paired station (STA).

The next generation WLAN system may support 80 MHz, contiguous 160 MHz, non-contiguous 80+80 MHz, and a channel bandwidth higher than the above-mentioned bandwidth in order to support a higher throughput. In addition, the next generation WLAN system supports a transceiving scheme of a duplicated data unit. In this case, the next generation WLAN system may support dynamic bandwidth operation. In connection with functions that may be supported in the next generation WLAN system as described above, a method for processing data that a transmit STA is to transmit and transmitting the data, a method for normally receiving the transmitted data in a receive STA, and an apparatus for supporting the same, has been demanded.

SUMMARY OF THE INVENTION

The present invention provides a method for transmitting a data frame in a wireless local area network (WLAN) system and an apparatus for supporting the same.

In an aspect, a wireless device of transmitting a data frame in a wireless local area network is provided. The wireless device includes: a media access control (MAC) unit generating a data frame; a physical (PHY) unit transmitting a wireless signal of the data frame; and a processor being operably coupled to the MAC unit and the PHY unit and controlling a set of TXVECTOR parameters. The processor is configured for: generating the data frame, the data frame including a data field having a service field and a very high throughput signal information (VHT-SIG-B); and transmitting a wireless signal of the data frame via a operating channel bandwidth. The data field is scrambled with a scrambling sequence, the scrambling sequence is generated based on a initial scrambling sequence and a generator polynomial. The service field is determined based on the set of TXVECTOR parameters, the TXVECTOR parameters including an control information for the service field.

The control information may indicate a format of the service field. If the control information indicates the format of the service field as very high throughput (VHT), the service field may include a scrambler initialization, a reserved field and a cyclic redundancy check (CRC).

The VHT-SIG-B may include length field and tail bits.

The cyclic redundancy check (CRC) may be calculated based on the VHT-SIG-B excluding the tail bits.

The scrambler initialization may have 7 bits, the reserved field may have 1 bit and cyclic redundancy check (CRC) may have 8 bits.

The initial scrambling sequence may include operating channel bandwidth information and a pseudo random integer, the operating channel bandwidth indicating the operating channel bandwidth.

The initial scrambling sequence may further include dynamic bandwidth information indicating whether a dynamic bandwidth operation is supported.

The operating channel bandwidth information may have 2 bits.

The 2 bits may indicate one among 20 MHz, 40 MHz, 80 MHz, contiguous 160 MHz and non-contiguous 80+80 MHz for the operating channel bandwidth.

The initial scrambling sequence may have 7 bits.

The generator polynomial may be represented by the below formula, $S(x)=x^7+x^4+1$.

In another aspect, a method for transmitting a data frame in a wireless local area network is provided. The method includes: generating a data frame, the data frame including a data field having a service field and a very high throughput signal information (VHT-SIG-B); and transmitting a wireless signal of the data frame via a operating channel bandwidth. The data field is scrambled with a scrambling sequence, the scrambling sequence is generated based on a initial scrambling sequence and a generator polynomial. The service field is determined based on a set of TXVECTOR parameters, the TXVECTOR parameters including an control information for the service field.

The control information may indicate a format of the service field. If the control information indicates the format of the service field as very high throughput (VHT), the service field may include a the scrambler initialization, a reserved field and a cyclic redundancy check (CRC).

The VHT-SIG-B may include length field and tail bits.

The CRC may be calculated based on the VHT-SIG-B excluding the tail bits.

The scrambler initialization may have 7 bits, the reserved field may have 1 bit and the CRC may have 8 bits.

The initial scrambling sequence may include operating channel bandwidth information and a pseudo random integer, the operating channel bandwidth information indicating the operating channel bandwidth.

The initial scrambling sequence may further include a dynamic bandwidth information indicating whether a dynamic bandwidth operation is supported.

The operating channel bandwidth information may have 2 bits.

The 2 bits may indicate one among 20 MHz, 40 MHz, 80 MHz, contiguous 160 MHz and non-contiguous 80+80 MHz for the operating channel bandwidth.

BRIEF DESCRIPTION OF THE DRAWINGS

FIG. 7 is a diagram showing an example of an initial scrambling sequence according to the exemplary embodiment of the present invention.

DESCRIPTION OF EXEMPLARY EMBODIMENTS

Figure 1:
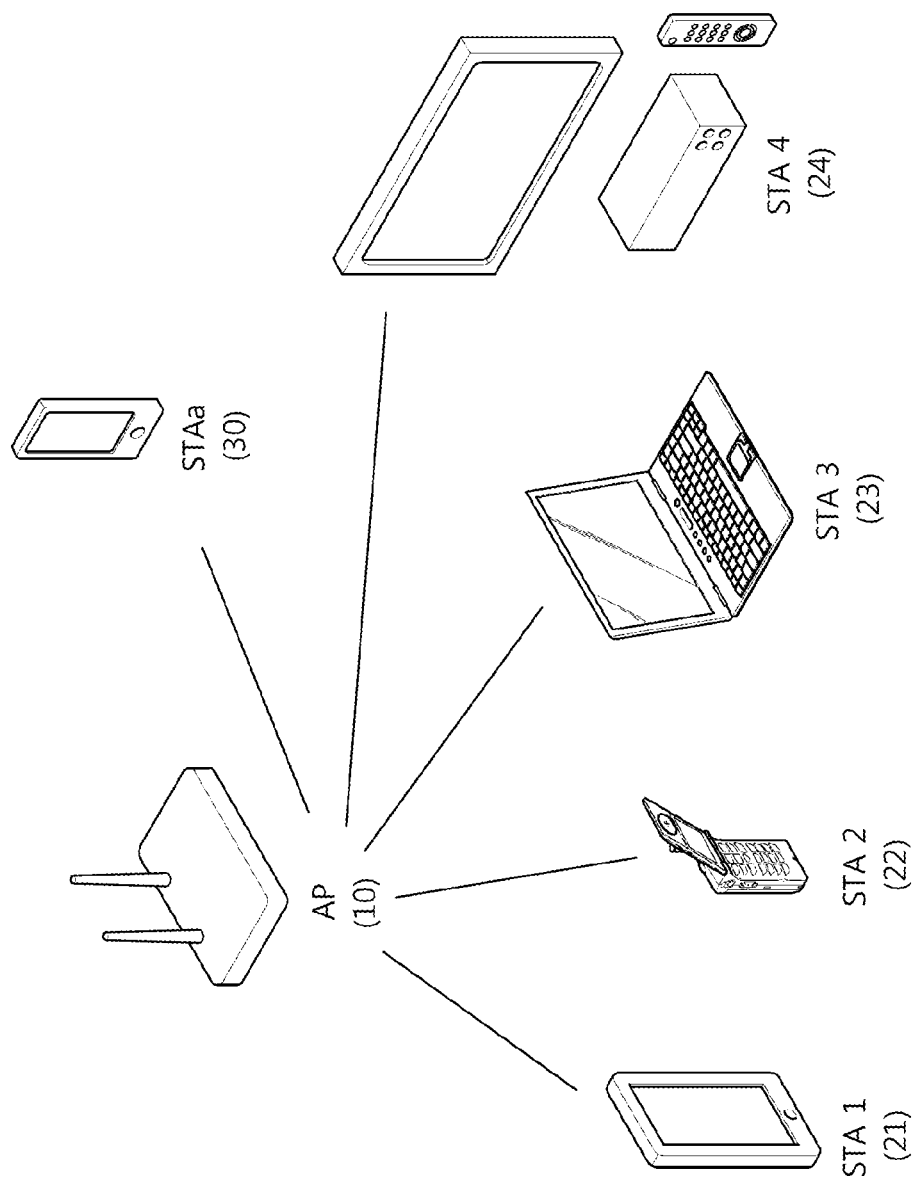
FIG. 1 is a diagram showing a configuration of a wireless local area network (WLAN) system to which an exemplary embodiment of the present invention may be applied.

FIG. 1 is a diagram showing a configuration of a wireless local area network (WLAN) system to which an exemplary embodiment of the present invention may be applied.

The WLAN system includes one or more basic service set (BSS). The BSS, which is a set of stations (STAs) that may be successfully synchronized with each other to communicate with each other, is not the concept of meaning a specific region.

An infrastructure BSS includes one or more non-AP station (STA), an access point (AP) 10 providing a distribution service, and a distribution system (DS) connecting a plurality of APs to each other. In the infrastructure BSS, the AP manages the non-AP STAs of the BSS.

On the other hand, an independent BSS (IBSS) is a BSS operating in an Ad-Hoc mode. Since the IBSS does not include the AP, it does not have a centralized management entity. That is, in the IBSS, the non-AP STAs are managed in a distributed manner. In the IBSS, all STAs may be mobile STAs, and an access to DS is not allowed, such that a self-contained network is formed.

The STA, which is any functional medium including a medium access control (MAC) according to the Institute of Electrical and Electronics Engineers (IEEE) 802.11 standard specification and a physical layer interface for a wireless medium, includes both of AP and non-AP stations in a broad sense.

The non-AP STA, which is an STA that is not the AP, may also be referred to as other names such as a mobile terminal, a wireless device, a wireless transmit/receive unit (WTRU), a user equipment (UE), a mobile station (MS), a mobile subscriber unit, or simply, a user, and the like. Hereinafter, the non-AP STA will be referred to as an STA for convenience of explanation.

The AP is a functional medium providing an access to the DS through a wireless medium for an STA associated with a corresponding AP. In the infrastructure BSS including the AP, communication between the STAs is performed through the AP in principle. However, in the case in which a direct link is set, direct communication between the STAs may also be performed. The AP may also be referred to as a central controller, a base station (BS), a node-B, a base transceiver system (BTS), a site controller, and the like.

A plurality of infrastructure BSSs including a BSS shown in FIG. 1 may be connected to each other through a distribution system (DS). The plurality of BSSs connected to each other through the DS is called an extended service set (ESS). An AP 10 and/or STAs 21, 22, 23, 24, and 30 included in the ESS may communicate with each other, and the STA may move from one BSS to another BSS while performing seamless communication.

In a WLAN system according to the IEEE 802.11, a basic access mechanism of a medium access control (MAC) is a carrier sense multiple access with collision avoidance (CSMA/CA) mechanism. The CSMA/CA mechanism, which is also called a distributed coordination function (DCF) of the IEEE 802.11 MAC, basically adopts a "listen before talk" access mechanism. According to this type of access mechanism, the AP and/or the STA senses a wireless channel or a medium before starting transmission. As a result of the sensing, when it is determined that the medium is in an idle status, the AP and/or the STA starts frame transmission through the corresponding medium. On the other hand, it is determined that the medium is in an occupied status, the corresponding AP and/or STA does not start it's transmission, but sets a delay time for a medium access to thereby wait.

The CSMA/CA mechanism also includes virtual carrier sensing, in addition to physical carrier sensing in which the AP and/or the STA directly senses the medium. The virtual carrier sensing is to complement a problem that may be generated in view of a medium access, such as a hidden node problem. In order to perform the virtual carrier sensing, the MAC of the WLAN system uses a network allocation vector (NAV). The NAV is a value notifying other APs and/or STAs of a remaining time until an AP and/or an STA that is currently using a medium or is authorized to use the medium is in a state in which it may use the medium. Therefore, the value set to the NAV corresponds to a period in which the medium is scheduled to be used by the AP and/or the STA transmitting a corresponding frame.

The IEEE 802.11 MAC protocol provides a hybrid coordination function (HCF) based on the DCF and a point coordination function (PCF) of performing periodic polling so that all receive APs and/or STAs may receive data packets in a polling based synchronous access scheme. The HCF has a HCF controlled channel access (HCCA) using a contention based enhanced distributed channel access (EDCA) and a contention free based channel access scheme using a polling mechanism as an access scheme in which a provider provides the data packets to a plurality of users. The HCF may include a medium access mechanism for improving quality of service (QoS) of the WLAN and the AP and/or the STA may transmit QoS data in both of a contention period (CP) and a contention free period (CFP).

The AP and/or the STA may perform a procedure of exchanging a request to send (RTS) frame and a clear to send (CTS) frame in order to inform the medium that it is to access the medium. The RTS frame and the CTS frame include information indicating a temporal section reserved to access a wireless medium required for transceiving an acknowledgement frame (ACK frame) in the case in which substantial data frame transmission and reception acknowledgement is supported. Another STA receiving a RTS frame transmitted from an AP and/or an STA that is to transmit a frame or receiving a CTS frame transmitted from a frame transmission target STA may be set so as not to access a medium during a temporal section indicated by information included in the RTS/CTS frames. This may be implemented by setting the NAV during the temporal section.

Figure 2:
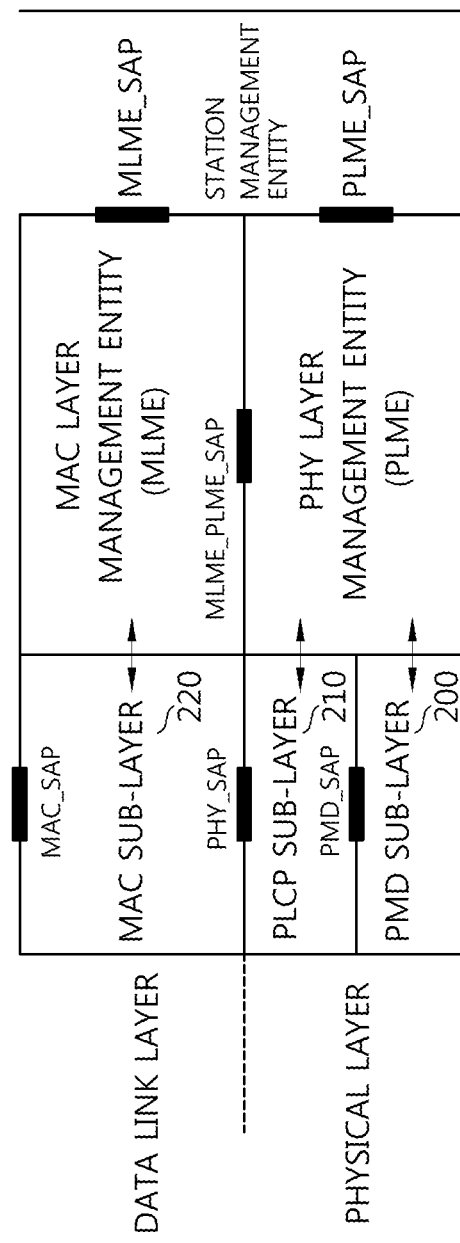
FIG. 2 is diagram showing a physical layer architecture of a WLAN system supported by the IEEE 802.11.

FIG. 2 is diagram showing a physical layer architecture of a WLAN system supported by the IEEE 802.11.

The wireless-medium physical layer (PHY) architecture of the IEEE 802.11 includes a PHY layer management entity (PLME), a physical layer convergence procedure (PLCP) sub-layer 210, a physical medium dependent (PMD) sub-layer 200. The PLME provides a management function of the physical layer in cooperation with a MAC layer management entity (MLME). The PLCP sub-layer 210 transfers an MAC protocol data unit (MPDU) received from an MAC sub-layer 220 to a PMD sub-layer 200 or transfers a frame coming from the PMD sub-layer 200 to the MAC sub-layer 220 according to instruction of the MAC layer, between the MAC sub-layer 220 and the PMD sub-layer 200. The PMD sub-layer 200, which is a lower layer of the PLCP, may allow a physical layer entity to be transmitted and received between two stations through a wireless medium. The MPDU transferred from the MAC sub-layer 220 is called a physical service data unit (PSDU) in the PLCP sub-layer 210. The MPDU is similar to the PSDU. However, when an aggregated MPDU (A-MPDU) formed by aggregating a plurality of MPDUs is transferred, individual MPDUs and PSDUs may be different.

The PLCP sub-layer 210 adds an additional field including information required by a physical layer transceiver to the PSDU during a process of receiving the PSDU from the MAC sub-layer 220 and transferring the PSDU to the PMD sub-layer 200. Here, the field added to the PSDU may be a PLCP preamble, a PLCP header, tail bits required to return a convolutional encoder to a zero state, or the like. The PCLP sub-layer 210 receives a TXVECTOR parameter including control information required to generate and transmit a PPDU and control information required for a receive STA to receive and interpret the PPDU, from the MAC sub-layer. The PLCP sub-layer 210 uses the information included in the TXVECTOR parameter in generating the PPDU including the PSDU.

The PLCP preamble serves to allow a receiver to prepare a synchronization function and antenna diversity before the PSDU is transmitted. The data field may include a coded sequence formed by encoding a bit sequence in which padding bits, a service field including a bit sequence for initializing a scrambler, and tail bits are added to the PSDU. Here, an encoding scheme may be one of a binary convolutional coding (BCC) encoding and a low density parity check encoding (LDPC) according to an encoding scheme supported by a STA receiving the PPDU. The PLCP header includes a field including information on a PLCP protocol data unit (PPDU) to be transmitted, which will be described below in more detail with reference to FIG. 3.

In the PLCP sub-layer 210, the above-mentioned field is added to the PSDU to generate the PLCP protocol data unit (PPDU) and transmit the PPDU to the receive station through the PDM sub-layer, and the receive station receives the PPDU and acquires information required to reconstruct data from the PLCP preamble and the PLCP header to reconstruct the data. The PLPC sub-layer of the receive station transfers an RXVECTOR parameter including the control information included in the PLPC preamble and the PLCP header to the MAC sub-layer to allow the PPDU to be interpreted and data to be acquired in a reception station.

Unlike an existing WLAN system, the next generation WLAN system requires a higher throughput. This is called a very high throughput (VHT). To this end, the next generation WLAN system is to support transmission in 80 MHz, contiguous 160 MHz, non-contiguous 80+80 MHz, and/or a bandwidth higher than the above-mentioned bandwidth. Further, the next generation WLAN system provides a multi-user multiple input multiple output (MU-MIMO) transmission method in order to provide higher throughput. In the next generation WLAN system, the AP may simultaneously transmit the data frame to at least one MIMO paired STA.

In the WLAN system as shown in FIG. 1, the AP 10 may simultaneously transmit the data to a STA group including at least one of the plurality of STAs 21, 22, 23, 24, and 30 associated therewith. Although the case in which the AP 10 performs the MU-MIMO transmission to the STAs 21, 22, 23, 24, and 30 is shown by way of example in FIG. 1, in a WLAN system supporting a tunneled direct link setup (TDLS), a direct link setup (DLS), or a mesh network, a STA that is to transmit data may transmit a PPDU to a plurality of STAs using the MU-MIMO transmission scheme. Hereinafter, the case in which the AP transmits the PPDU to the plurality of STAs using the MU-MIMO transmission scheme will be described by way of example.

The data transmitted to each STA may be transmitted through different spatial streams. The data frame transmitted by the AP 10 may be referred to as a PPDU generated and transmitted in a physical layer (PHY) of the WLAN system. In an example of the present invention, it is assumed that a transmission target group MU-MIMO paired with the AP 10 is a STA1 21, a STA2 22, a STA3 23, and a STA4 24. Here, the spatial stream is not allocated to a specific STA in the transmission target STA group, such that the data may not be transmitted thereto. Meanwhile, it is assumed that a STAa 30 is a STA that is associated with the AP but is not included in the transmission target STA group.

In the WLAN system, the transmission target STA group may be allocated with an identifier, which is called a group identifier (Group ID). The AP transmits a group ID management frame including group definition information to the STAs supporting the MU-MIMO transmission in order to allocate the group ID thereto, such that the group ID is allocated to the STAs before transmission of the PPDU. One STA may be allocated with a plurality of group IDs.

The following Table 1 shows information elements included in a group ID management frame.

TABLE 1

| Order | Information |
|---|---|
| 1 | Category |
| 2 | VHT Action |
| 3 | Membership Status |
| 4 | Spatial Stream Position |

A category field and a VHT action field are set so that it may be identified that a corresponding frame corresponds to a management frame and is a group ID management frame used in the next generation WLAN system.

As shown in Table 1, the group definition information includes membership status information indicating whether or not a specific STA pertains to a specific group ID and spatial stream position information indicating whether a spatial stream set of the specific STA corresponds to the n-th position in the entire spatial stream according to the MU-MIMO transmission in the case in which the specific STA pertains to the specific group ID.

Since a single AP manages a plurality of group IDs, the membership status information provided to a single STA needs to indicate whether or not the STA pertains to each of the group IDs managed by the AP. Therefore, the membership status information may be present in a form of an array of sub-fields indicating whether the STA pertains to each group ID. Since the spatial stream position information indicates positions for each of the group IDs, it may be present in a form of an array of sub-fields indicating a position of a spatial stream set occupied by the STA for each of the group IDs. In addition, the membership status information and the spatial stream position information for a single group ID may be implemented in a single sub-field.

In the case in which the AP transmits the PPDU to the plurality of STAs through the MU-MIMO transmission scheme, it allows information indicating the group ID to be included in the PPUD as control information and then transmit the PPDU. When the STA receives the PPDU, it confirms a group ID field to confirm whether the STA is a member STA in the transmission target STA group. It is confirmed that the STA is the member STA in the transmission target STA group, the STA may confirm whether the spatial stream set transmitted to the STA is positioned at the n-th position in the entire spatial stream. Since the PPDU includes information on the number of spatial streams allocated to the receive STA, the STA may search the spatial streams allocated thereto to receive the data.

Figure 3:
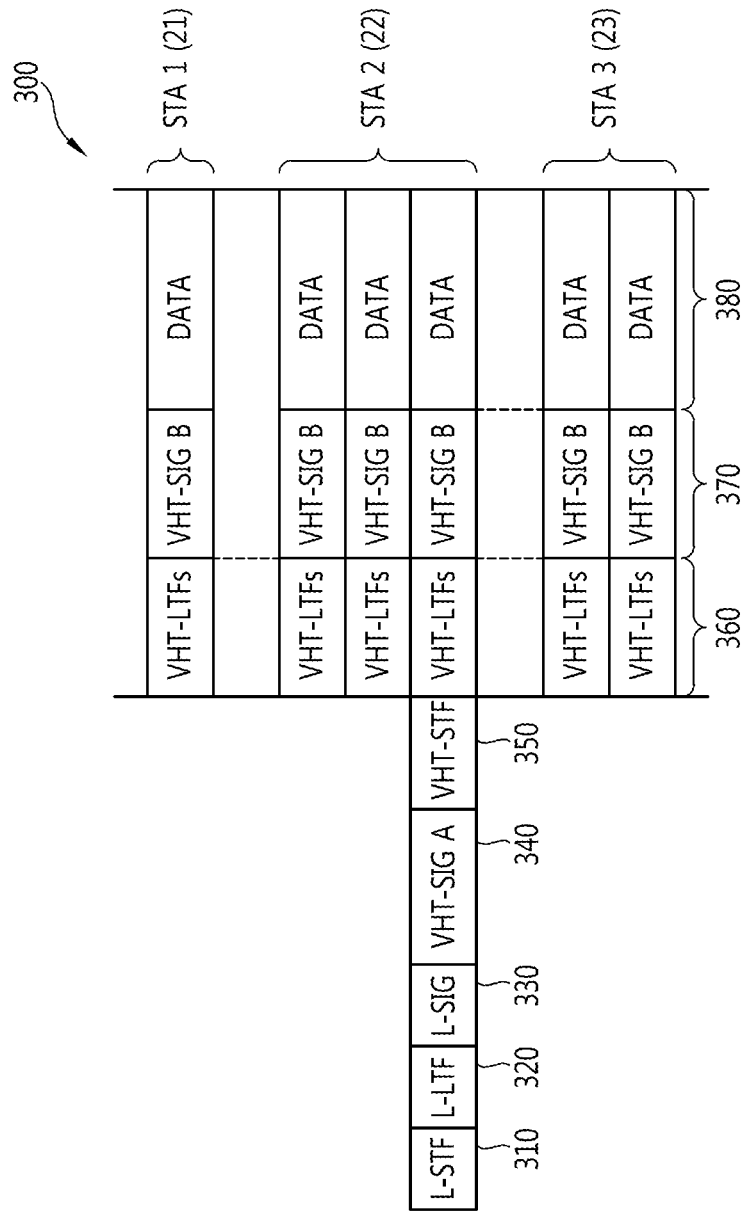
FIG. 3 is a diagram showing an example of a PPDU format used in the WLAN system.

FIG. 3 is a diagram showing an example of a PPDU format used in the WLAN system.

Referring to FIG. 3, the PPDU 300 may include L-STF 310, L-LTF 320, an L-SIG field 330, a VHT-SIGA field 340, VHT-STF 350, VHT-LTFs 360, VHT-SIGB fields 370, and data fields 380.

The PLCP sub-layer configuring the PHY adds required information to the PSDU received from the MAC layer to convert the PSDU into the data field 380, and adds fields such as the L-STF 310, the L-LTF 320, the L-SIG field 330, the VHT-SIGA field 340, the VHT-STF 350, the VHT-LTF 360, and the VHT-SIGB field 370, and the like, to the data field 380 to generate the PPDU 300 and transmit the PPDU 300 to one or more STA through the PMD sub-layer configuring the PHY. The control information required for the PLCP sub-layer to generate the PPDU is provided from the TXVECTOR parameter received from the MAC layer. Meanwhile, the control information used for the receive STA to receive and interpret the PPDU is provided from the RXVECTOR parameter based on the control information included in the PLCP header of the PPDU.

The L-STF 310 is used for frame timing acquisition, automatic gain control (AGC) convergence, coarse frequency acquisition, or the like.

The L-LTF 320 is used for channel estimation for demodulation of the L-SIG field 330 and the VHT-SIGA field 340.

The L-SIG field 330 is used for an L-STA to receive and interpret the PPDU 300 to acquire the data. The L-SIG field 330 includes a rate sub-field, a length sub-field, a parity bit, and a tail field. The rate sub-field is set to a value indicating a bit rate for data that is currently to be transmitted.

The length sub-field is set to a value indicating an octet length of the PSDU that the MAC layer requests the PHY layer to transmit. Here, an L_LENGTH parameter which is a parameter related to information on the octet length of the PSDU is determined based on an TXTIME parameter which is a parameter related to a transmission time. The TXTIME indicates a transmission time determined by the PHY layer for transmission of the PPDU including PSDU in response to a transmission time requested by the MAC layer for transmission of the PSDU. Therefore, since the L_LENGTH parameter is a parameter related to a time, the length sub-field included in the L-SIG field 330 includes information related to the transmission time.

The VHT-SIGA field 340 includes control information (or signal information) required for the STAs receiving the PPDU 300 to interpret the PPDU 300. The VHT-SIGA field 340 is transmitted as two OFDM symbols. Therefore, the VHT-SIGA field 340 may be divided into a VHT-SIGA1 field and a VHT-SIGA2 field. The VHT-SIGA1 field includes channel bandwidth information used for transmitting the PPDU, identification information related to whether or not space time block coding (STBC) is used, information indicating a scheme (SU-MIMO or MU-MIMO) in which the PPDU is transmitted, information indicating the transmission target STA group which is a plurality of STAs MU-MIMO paired with the AP when the transmission method is the MU-MIMO, and information on the spatial streams allocated to each STA included in the transmission target STA group. The VHT-SIGA2 field includes information related to a short guard interval (GI).

The information indicating the MIMO transmission scheme and the information indicating the transmission target STA group may be implemented by single MIMO indication information, for example, a group ID. The group ID may be set to a value having a specific range, a specific value of which indicates the SU-MIMO transmission scheme and other values may be used as an identifier for a corresponding transmission target STA group in the case in which the PPDU 300 is transmitted by the MU-MIMO transmission scheme.

When the group ID indicates that the corresponding PPDU 300 is transmitted by the SU-MIMO transmission scheme, the VHT-SIGA2 field includes information indicating whether a coding scheme applied to the data field is binary convolutional coding (BCC) or low density parity check (LDPC) coding and modulation coding scheme (MCS) information on a channel between a sender and a receiver. In addition, the VHT-SIGA2 field includes an AID of the transmission target STA of the PPDU and/or a partial AID including a partial bit sequence of the AID.

When the group ID indicates that the corresponding PPDU 300 is transmitted through the MU-MIMO transmission scheme, the VHT-SIGA field 300 includes coding indication information indicating whether a coding scheme applied to a data field that is intended to be transmitted to the MU-MIMO paired receive STAs is the BSS or the LDPC coding. In this case, MCS information on each receive STA may be included in the VHT-SIGB field 370.

The VHT-STF 350 is used to improve performance of AGC estimation in the MIMO transmission.

The VHT-LTE 360 is used for the STA to estimate an MIMO channel. Since the next generation WLAN system supports the MU-MIMO, the VHT-LTFs 360 may be set to the number corresponding to the number of spatial streams through which the PPDU 300 is transmitted. Additionally, full channel sounding is supported. In the case in which the full channel sounding is performed, the number of VHT LTEs may increase.

The VHT-SIGB field 370 includes dedicated control information required for the plurality of MIMO paired STAs to receive the PPDU 300 to acquire the data. Therefore, the STA may be designed so as to decode the VHT-SGIB field 370 only in the case in which common control information included in the VHT-SIGB field 370 indicates that the currently received PPDU 300 is MU-MIMO transmitted. To the contrary, the STA may be designed so as not to decode the VHT-SGIB field 370 only in the case in which the common control information indicates that the currently received PPDU 300 is for a single STA (including the SU-MIMO).

The VHT-SIGB field 370 includes information on MCS for each STA and information on rate-matching. In addition, the VHT-SIGB field 370 includes information indicating a length of the PSDU included in the data field for each STA. The information indicating the length of the PSDU, which is information indicating a length of a bit sequence of the PSDU, may indicate the length in an octet unit. A size of the VHT-SIGB field 370 may be changed according to a type of MIMO transmission (MU-MIMO or SU-MIMO) and a bandwidth of a channel used for transmission of the PPDU.

The data field 380 includes the data that is intended to be transmitted to the STA. The data field 380 includes the PSDU which is the MPDU transferred from the MAC layer, a service field for initializing the scrambler, a tail field including a bit sequence required to return a convolutional encoder to a zero state, and padding bits for standardizing the data field.

In the WLAN system as shown in FIG. 1, in the case in which the AP 10 is to transmit the data to the STA1 21, the STA2 22, and the STA3 23, it may transmit the PPDU to the STA group including the STA1 21, the STA2 22, the STA3 23, and the STA4 24. In this case, as shown in FIG. 3, the spatial streams may be allocated so that the spatial streams allocated to the STA4 24 are not present, and a specific number of spatial streams may be allocated to each of the STA1 21, the STA2 22, and the STA3 23, thereby transmitting the data. In an example as shown in FIG. 3, it may be appreciated that a single spatial stream is allocated to the STA3 31, three spatial streams are allocated to the STA2 22, and two spatial streams are allocated to the STA3 23.

Figure 4:
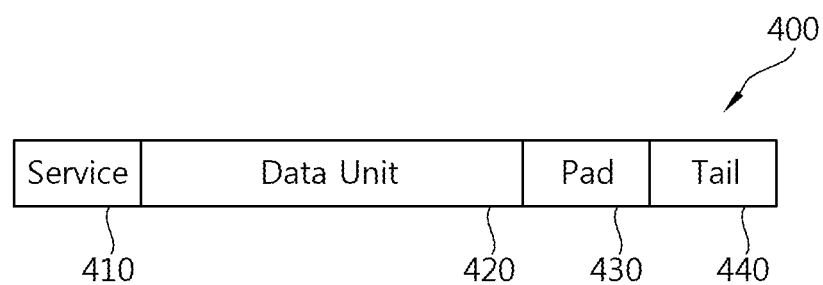
FIG. 4 is a block diagram showing a format of a data field according to the exemplary embodiment of the present invention.

FIG. 4 is a block diagram showing a format of a data field according to the exemplary embodiment of the present invention.

Referring to FIG. 4, the data field 400 includes a service field 410, a data unit 420, padding bits 430, and a tail field 440.

The service field 410 may include a bit sequence for initializing the scrambler and a cyclic redundancy check (CRC) bit sequence calculated for a corresponding VHT-SIGB field transmitted to the receive STA. A process of generating the service field in the transmit STA and a detailed structure of the service field will be described below in detail.

The data unit 420, which is a data unit transferred from the MAC layer, may be the PSDU. Lengths of the PSDUs may be different in each receive STA, and be different according to the transmitted spatial stream even in the same receive STA. However, lengths of the PPDUs are the same as each other in transmitting the PPDUs in the transmit STA. Therefore, it is required to set the lengths of the data fields to be the same as each other. Therefore, the padding bits 430 are added to the data unit 420. Meanwhile, the padding bits 430 added to the data unit 420 may have lengths changed according to the lengths of the data units and may not be added to some data units.

The tail field 440 may be included only in the case in which a bit sequence configuring the data field is encoded according to the BCC encoding scheme and may include a bit sequence used to make a BCC encoder a zero state. Since encoding schemes that may be supported in each STA may be different and encoding schemes that is to be applied to the data units transmitted to each STA may be different, the tail field may be included in a data field for a specific STA and may not be included in a data field for another specific STA. Hereinafter, an example of a method for transmitting a data unit through generation and transmission of the PPDU will be described in detail.

Figure 5:
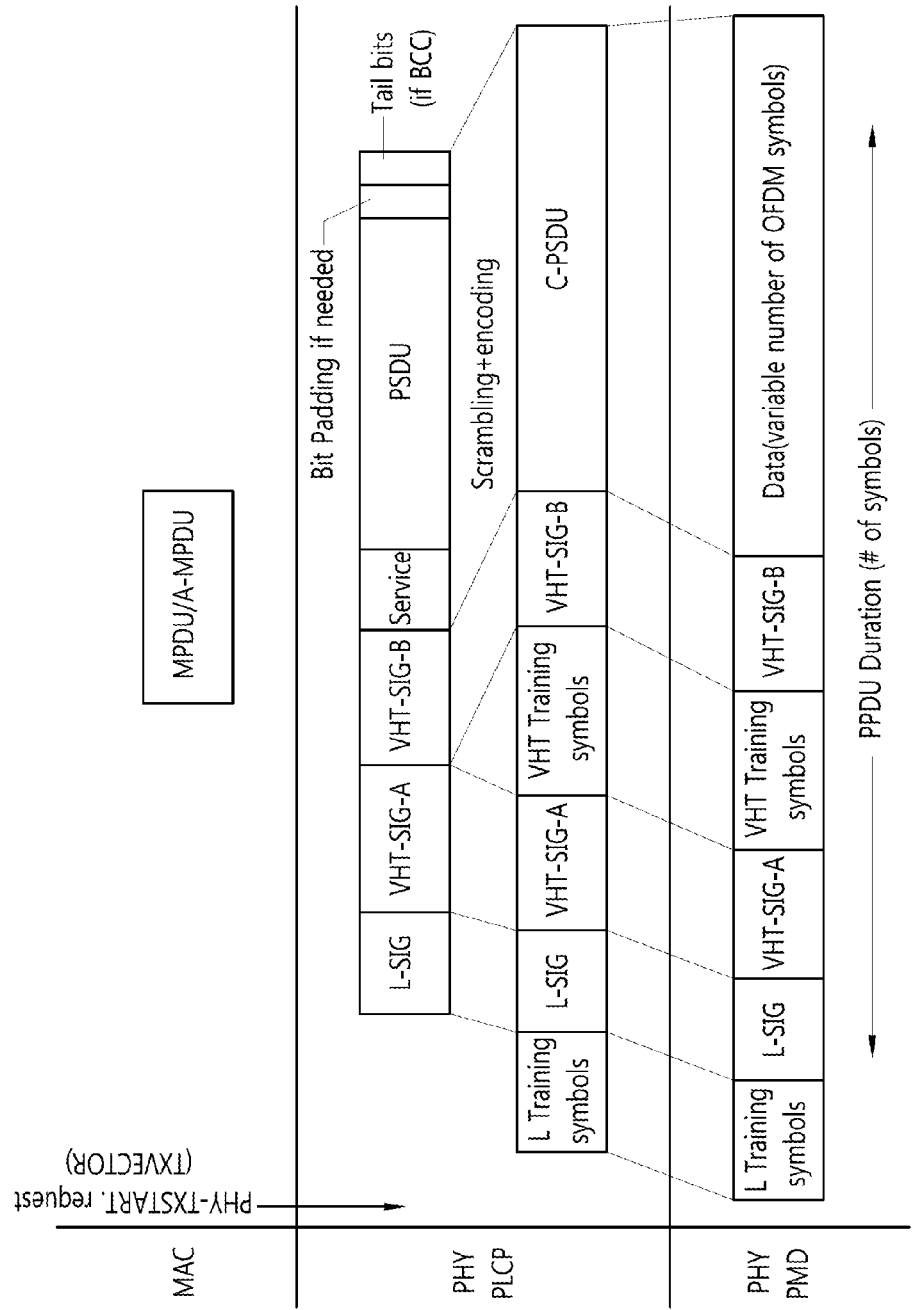
FIG. 5 is a diagram showing an example of a method for transmitting a data unit based on a method for generating a PPDU according to the exemplary embodiment of the present invention.

FIG. 5 is a diagram showing an example of a method for transmitting a data unit based on a method for generating a PPDU according to the exemplary embodiment of the present invention.

Referring to FIG. 5, the MAC layer transfers a generated data unit, that is, an MPDU or an A-MPDU to the PLCP sub-layer. In the PLCP sub-layer, the MPDU or the A-MPDU is called a PSDU. The PLCP sub-layer adds control information to the PSDU. The control information is required to transmits the PSDU to another STA through the PHY layer and is required of the another STA to acquire data by receiving, demodulating and decoding the corresponding PPDU. The corresponding control information may be included in the L-SIG field, the VHT-SIGA field, and the VHT-SIGB field, and the tail field may be additionally added according to a type of an encoder (in the case in which the encoder is a BBC encoder). The control information may be added in the PSCP sub-layer based on the TXVECTOR parameter transferred from the MAC layer to the PHY layer.

The TXVECTOR parameter may further include an information parameter indicating a bandwidth for transmission of a data unit in duplicated format applied to the PSDU and/or an information parameter indicating whether or not dynamic bandwidth operation is supported at the time of transmission of the duplicated data unit. The bandwidth indication information parameter indicates a transmission bandwidth, and a bandwidth value may be set to 20 MHz, 40 MHz, 80 MHz, 160 MHz and/or 80+80 MHz. The dynamic bandwidth indication information parameter may be set to indicate 'Dynamic' in the case in which the dynamic bandwidth operation is supported and be set to indicate 'Static' in the case in which the dynamic bandwidth operation is not supported, which may be implemented by 1 bit. In the case in which the dynamic bandwidth indication information parameter is set to a value indicating 'Dynamic', the receive STA may transmit a data unit responding to the data unit to the transmit STA using the entirety or a portion of a channel band through which the data unit is transmitted. On the other hand, in the case in which the dynamic bandwidth indication information parameter is set to a value indicating 'Static', the receive STA may transmit a response data unit to the transmit STA using only a channel band through which the data unit is transmitted. The use of the channel band means that the bandwidth indication information parameter of the TXVECTOR for the response data unit is set to a corresponding bandwidth value and is used.

Meanwhile, the bandwidth indication information parameter and/or the dynamic bandwidth indication information parameter may be the basis for a procedure of generating a scrambling code for scrambling the data field. This will be described below in more detail.

The following Table 2 shows a configuration of a TXVECTOR parameter.

TABLE 2

| Parameter | Associated Primitive | Value |
| --- | --- | --- |
| Bandwidth Indication Information (CH_BANDWIDTH_IN_NON_HT) | PHY-TXSTART.request (TXVECTOR) | CBW20, CBW40, CBW80, CBW160 or CBW80 + 80 if any |
| Dynamic Bandwidth Indication Information (DYN_BANDWIDTH_IN_NON_HT) | PHY-TXSTART.request (TXVECTOR) | Static or Dynamic if any |

The transmit STA adds the service field, the padding bit (if needed), and the tail bit (in the case of the BCC encoding) to the PSDU including the data that is to be transmitted.

The service field may include a bit sequence for initializing the scrambler and a cyclic redundancy check (CRC) bit sequence calculated for a corresponding VHT-SIGB field transmitted to the receive STA (however, the CRC bit sequence is calculated except for the tail bit included in the VHT-SIGB field). A format of the service field may be represented by the following Table 3.

TABLE 3

| Bits | Field | Description |
| --- | --- | --- |
| B0~B6 | Scrambler Initialization | Set to 0 |
| B7 | Reserved | |
| B8~B15 | CRC | CRC calculated for VHT-SIGB Field (except for Tail Bits) |

The service field for the PPDU that may be used in the next generation WLAN system includes the CRC bit sequence calculated for the VHT-SIGB field. On the other hand, since the VHT-SIGB field is not included in the existing WLAN system, the CRC bit sequence is not included in the service field. Therefore, the transmit STA needs to generate different service fields according to whether the PPDU format is the format used in the next generation WLAN system or the format used in the existing WLAN system to add the generated service field to the PSDU. To this end, a service field information parameter which is an information parameter related to the service field is included in the TXVECTOR parameter, and the transmit STA may be implemented to generate the service field based on the service field information parameter. The following Table 4 shows the service field information parameter included in the TXVECTOR parameter.

TABLE 4

| Parameter | Condition | Transmission/Reception Vector Applying Value | TXVECTOR | RXVECTOR |
| --- | --- | --- | --- | --- |
| Service Field | Format = Legacy | Scrambler Initialization, 7 Null Bits + 9 Reserved Bits | Yes | No |
| | Format = High Throughput | Scrambler Initialization, 7 Null Bits + 9 Reserved Bits | Yes | No |
| | Format = Very High Throughput | Scrambler Initialization, 7 Null Bits + 1 Reserved Bit + CRC Bits for VHT-SIGB Field | Yes | No |

The transmit STA may generate the service field having the structure as shown in Table 3 based on the service field information parameter indicating the next generation WLAN system, that is, indicating the very high throughput (VHT) format.

The transmit STA scrambles the added field and bits and the PSDU. The scrambling performed by the transmit STA is based on the scrambling code generated by the transmit STA. A scrambling process will be described below in more detail with reference to FIG. 6.

Figure 6:
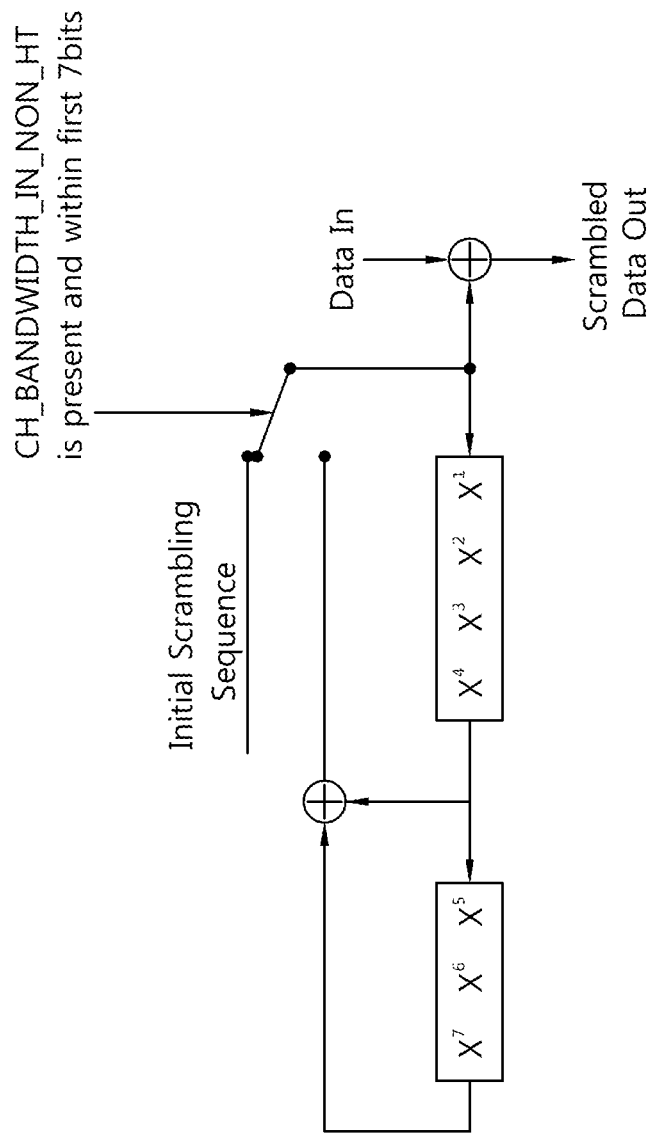
FIG. 6 is a diagram showing an example of scrambling according to the exemplary embodiment of the present invention.

FIG. 6 is a diagram showing an example of scrambling according to the exemplary embodiment of the present invention.

Referring to FIG. 6, input data Data In is a bit sequence including the service field, the PSDU, the padding bits, and the tail bits scrambled by the transmit STA. The transmit STA generates a scrambling sequence based on an initial scrambling sequence and a generator polynomial. In the present example, the generator polynomial S(x) may be represented by the following Equation 1.

$$S(x) = x^7 + x^4 + 1 \quad \text{[Equation 1]}$$

When the bandwidth indication information parameter is not included in the TXVECTOR, the transmit STA may set the initial scrambling sequence to a 7 bit pseudo random non-zero integer.

When the bandwidth indication information parameter is included in the TXVECTOR, the initial scrambling sequence may be set as shown in FIG. 7.

FIG. 7 is a diagram showing an example of an initial scrambling sequence according to the exemplary embodiment of the present invention.

Referring to FIG. 7, in the case in which a bandwidth indication information parameter CH_BANDWIDTH_IN_NON_HT is present in the TXVECTOR parameter and a dynamic bandwidth indication information parameter DYN_BANDWIDTH_IN_NON_HT is not present in the TXVECTOR, the scrambling sequence includes a 5 bit pseudo random integer and a set value of the bandwidth indication information parameter. In the case in which the bandwidth indication information parameter is set to a value (CBW20) indicating 20 MHz, the 5 bit pseudo random integer may be set to a 5 bit pseudo random non-zero integer. In the case in which the bandwidth indication information parameter is set to a value other than the value (CBW20) indicating 20 MHz, the 5 bit pseudo random integer needs not to be the 5 bit pseudo random non-zero integer.

In the case in which both of the bandwidth indication information parameter and the dynamic bandwidth indication information parameter are present in the TXVECTOR parameter, the scrambling sequence includes a 4 bit pseudo random integer, a set value of the dynamic bandwidth indication information parameter, and a set value of the bandwidth indication information parameter. In the case in which the bandwidth indication information parameter is set to a value (CBW20) indicating 20 MHz and the dynamic bandwidth indication information parameter is set to a value indicating 'Static', the 4 bit pseudo random integer may be set to a 4 bit pseudo random non-zero integer. In the case other than the above-mentioned case, the 4 bit pseudo random integer needs not to be the 4 bit pseudo random non-zero integer.

The following Table 5 and Table 6 show examples of the set values of the bandwidth indication information parameter and the dynamic bandwidth indication information parameter.

TABLE 5

| Enumerated Value | Set value |
| --- | --- |
| CBW20 | 0 |
| CBW40 | 1 |
| CBW80 | 2 |
| CBW160 or CBW80 + 80 | 3 |

TABLE 6

| Enumerated Value | Set value |
| --- | --- |
| Static | 0 |
| Dynamic | 1 |

Meanwhile, in the bandwidth indication information parameter, the least significant bit (LSB) among bits that are set values of the information parameters is first transmitted. For example, in the case in which the bandwidth indication information parameter is set to a value indicating CBW80, it may be represented by '1 0'. In this case, B5 of the initial scrambling sequence is set to 0, and B6 thereof is set to 1.

As shown in FIGS. 6 and 7, the transmit STA may generate the initial scrambling sequence based on the bandwidth indication information parameter and the dynamic bandwidth indication information parameter of the TXVECTOR parameter and generate the scrambling sequence based on the initial scrambling sequence and the generator polynomial. The transmit STA perform the scrambling based on the scrambling sequence. The transmit STA scrambles the input data based on the scrambling sequence to output the scrambled data (scrambled data out).

Again referring to FIG. 5, the transmit STA encodes the scrambled added bits and the PSDU according to a specific encoding scheme. As the encoding scheme, the BCC encoding scheme or the LDPC encoding scheme may be applied. A concept of including the scrambled encoded PSDU and the field/bits added thereto may called a coded-PSDU (C-PSDU). The C-PSDU may be called a data field.

The PLCP sub-layer may further add a training symbol in order to synchronize wireless resources, acquire timing, and acquire antenna diversity between a transmit end AP and/or STA and a receive end STA. This may be implemented by adding legacy training symbols including the L-STF and L-LTF for the L-SAT and VHT training symbols including the VHT-STF and VHT-LTF for the VHT-STA. The PPDU transmitted through the wireless resource is mapped to an OFDM symbol and transmitted through the wireless resource. Here, the PPDU mapped to the OFDM symbol and/or the data field included in the PPDU may be implemented to have a specific bit size and be implemented to be a multiple of octet through the padding bit sequence added to the PSDU. The generate PPDU may be mapped to the OFDM symbols and then transmitted to at least one MIMO paired target STAs.

Figure 8:
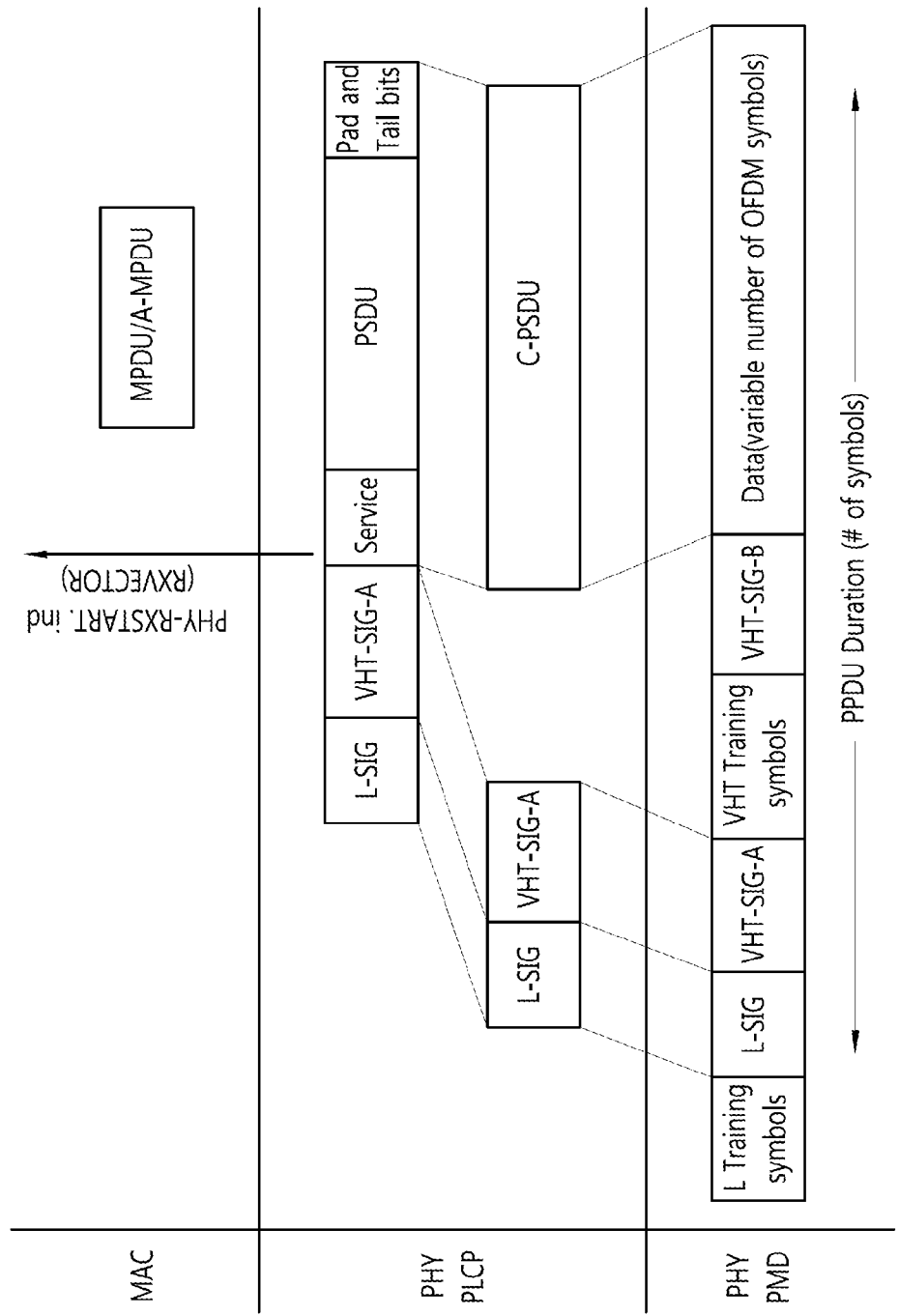
FIG. 8 is a diagram showing an example of a method for receiving a PPDU generated according to the exemplary embodiment of the present invention.

FIG. 8 is a diagram showing an example of a method for receiving a PPDU generated according to the exemplary embodiment of the present invention.

Referring to FIG. 8, the receive STA starts to receive the VHT training symbol and the VHT-SIGB field based on the L-SIG field and the VHT-SIGA field.

The receive STA does not decode the VHT-SIGB field when the group ID of the VHT-SIGA field indicates the SU-MIMO. On the other hand, the receive STA decodes the VHT-SIGB field when the group ID of the VHT-SIGA field indicates the MU-MIMO. When the VHT-SIGB field is decoded, the receive STA confirms the CRC bit sequence of the service field to confirm whether or not abnormality is present in the CRC.

Then, a terminal receives, decodes, and descrambles the C-PSDU. The decoding of the C-PSDU is performed corresponding to encoding scheme indication information included in the VHT-SIGA field. The descrambling of the C-PSDU may be performed corresponding to the applied scrambling sequence.

Meanwhile, the receive STA may set a specific bit value of an initial scrambling sequence which is first 7 bits of the scrambling sequence to the bandwidth indication information parameter and/or the dynamic bandwidth indication information parameter of the RXVECTOR which is the receiving information parameter. This may correspond to an implementation of FIG. 7 which is a relationship between the bandwidth indication information parameter and the dynamic bandwidth indication information parameter of the TXVECTOR and the scrambling sequence.

When the C-PSDU is decoded and descrambled, the PSDU which is the data unit including the data may be acquired. Through this process, the receive STA may normally receive the data unit.

According to the above-mentioned exemplary embodiment, in the next generation WLAN system extended to a wider band, the channel bandwidth related information and the support indication information of the dynamic bandwidth operation are through the scrambling sequence, but not being implemented in a separate signal field. Therefore, it is possible to support transmission and reception using a wide bandwidth, transmission and reception of a data unit in duplicated format, and/or transmission and reception of a dynamic bandwidth without using the signal field short due to a large amount of information required to support the MU-MIMO. In addition, the initial scrambling sequence, which may be used even in the existing WLAN system, may secure backward compatibility.

Further, in the above-mentioned exemplary embodiment, the information parameter related to the implementation of the service field is additionally included in the TXVECTOR parameter, whereby the transmit STA may accurately generate the service field appropriate for the PPDU format of the WLAN system supporting the MU-MIMO. This reduces the possibility that an error such as a failure of an exchange of the data unit between the transmit and receive STAs occurs, thereby making it possible to secure communication having higher reliability.

Figure 9:
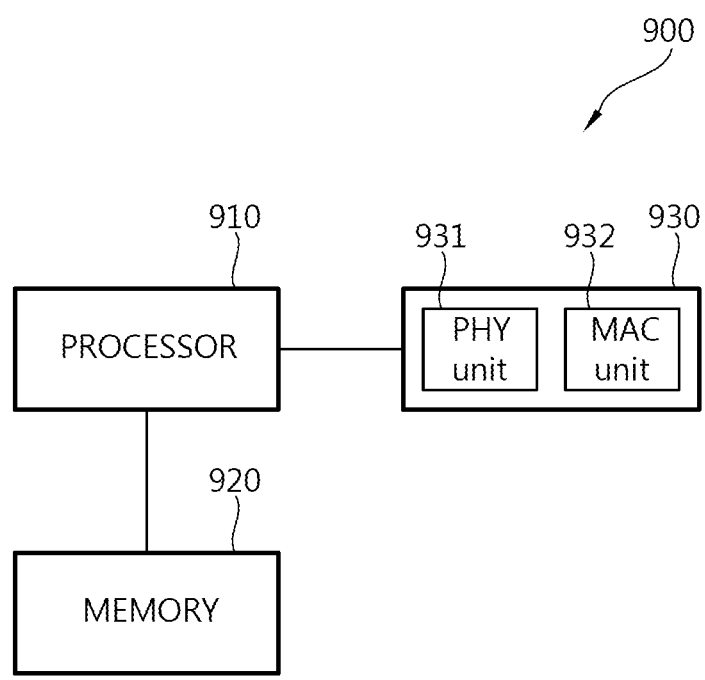
FIG. 9 is a block diagram showing a wireless apparatus to which the exemplary embodiment of the present invention may be implemented.

FIG. 9 is a block diagram showing a wireless apparatus to which the exemplary embodiment of the present invention may be implemented.

Referring to FIG. 9, the wireless apparatus 900 includes a processor 910, a memory 920, and a transceiver 930. The transceiver 930 includes a physical (PHY) unit 931 and a media access unit (MAC) unit 932, transmits and/or receives a wireless signal, and implements a PHY layer and an MAC layer of the IEEE 802.11. The processor 910 is functionally connected to the transceiver 930 and is set to implement the MAC layer and/or the PHY layer implementing the exemplary embodiment of the present invention related to the transmission and reception of the data unit through the generation of the PPDU and shown in FIGS. 4 to 8. In addition, the processor 910 is set to control a set of the TXVECTOR parameters.

The processors 910 and/or the transceiver 930 may include an application-specific integrated circuit (ASIC), other chipsets, logical circuits, and/or data processing apparatuses. When the exemplary embodiment is implemented by software, the above-mentioned method may be implemented by a module (a process, a function, or the like) that performs the above-mentioned function. The module may be stored in the memory 920 and be performed by the processor 910. The memory 920 may be included inside the processor 910 and may be separately positioned outside the process 910 and be functionally connected to the processor 910 by widely known various units.

As set forth above, according to the exemplary embodiments of the present invention, in the next generation WLAN system supporting transmission in a wider band, the channel bandwidth related information and the support indication information of the dynamic bandwidth operation are not implemented in the signal field, but may be implemented by setting the scrambling sequence. Therefore, it is possible to support transmission and reception of the data frame using a wide bandwidth, transmission and reception of the data frame including the data unit in duplicated format, the dynamic bandwidth operation without allocating signal field short due to a large amount of information required to support the MU-MIMO. To this end, the set initial scrambling sequence, which may be used even in the existing WLAN system, may secure backward compatibility.

Further, in the above-mentioned exemplary embodiment, the information parameter related to the implementation of the service field is additionally included in the transmission information parameter (TXVECTOR), whereby the transmit STA may accurately generate the service field appropriate for the frame format of the WLAN system supporting the MU-MIMO. This reduces the possibility that an error such as a failure of an exchange of the data frame between the transmit and receive STAs will occur, thereby making it possible to secure communication having higher reliability.

What is claimed is:

1. A wireless device of transmitting a data frame in a wireless local area network, the wireless device comprising: a media access control (MAC) unit configured to generate a data frame; a physical (PHY) unit configured to transmit a wireless signal of the data frame; and a processor being operably coupled to the MAC unit and the PHY unit and controlling a set of Transmission Vector (TXVECTOR) parameters, wherein the processor is configured for generating the set of TXVECTOR parameters, the set of TXVECTOR parameters including a service field TXVECTOR parameter; generating a data unit, the data unit including a data field having a service field and a very high throughput signal field (VHT-SIG-B), the service field including a scrambler initialization field, a reserved field and a cyclic redundancy check (CRC) field, the VHT-SIG-B including a length field and a tail field; and transmitting a wireless signal of the data unit via an operating channel bandwidth, wherein the data field is scrambled with a scrambling sequence, and the scrambling sequence is generated based on an initial scrambling sequence and a generator polynomial, wherein the service field is determined based on the service field TXVECTOR parameter and the VHT-SIG-B, and wherein the CRC field is set to CRC bits calculated based on the VHT-SIG-B excluding tail bits of the tail field.

2. The wireless device of claim 1, wherein the set of TXVECTOR parameters further includes a format TXVECTOR parameter indicating a format of the data unit, wherein if the format TXVECTOR parameter indicates the format of the data unit as very high throughput (VHT), the scrambler initialization field includes 7 zero bits, and the reserved field includes a reserved zero bit.

3. The wireless device of claim 1, wherein the initial scrambling sequence includes operating channel bandwidth information and a pseudo random integer, the operating channel bandwidth information indicating the operating channel bandwidth.

4. The wireless device of claim 3, wherein the initial scrambling sequence further includes dynamic bandwidth information indicating whether a dynamic bandwidth operation is supported.

5. The wireless device of claim 4, wherein the operating channel bandwidth information has 2 bits.

6. The wireless device of claim 5, wherein the 2 bits indicates one among 20 MHz, 40 MHz, 80 MHz, contiguous 160 MHz and non-contiguous 80+80 MHz for the operating channel bandwidth.

7. The wireless device of claim 1, wherein the initial scrambling sequence has 7 bits.

8. The method of claim 7, wherein the generator polynomial is represented by the below formula, $$S(x)=x^7+x^4+1,$$

wherein $S(x)$ is the generator polynomial, and x is a variable.

9. A method for transmitting a data frame in a wireless local area network, the method comprising: generating a set of Transmission Vector (TXVECTOR) parameters, the set of TXVECTOR parameters including a service field TXVECTOR parameter; generating a data unit, the data unit including a data field having a service field and a very high throughput signal field (VHT-SIG-B), the service field including a scrambler initialization field, a reserved field and a cyclic redundancy check (CRC) field, the VHT-SIG-B including a length field and a tail field; and transmitting a wireless signal of the data unit via an operating channel bandwidth, wherein the data field is scrambled with a scrambling sequence, the scrambling sequence is generated based on an initial scrambling sequence and a generator polynomial, wherein the service field is determined based on the service field TXVECTOR parameter and the VHT-SIG-B, and wherein the CRC field is set to CRC bits calculated based on the VHT-SIG-B excluding tail bits of the tail field.

10. The method of claim 9, wherein the set of TXVECTOR parameters further includes a format TXVECTOR parameter indicating a format of the data unit, wherein if the format TXVECTOR parameter indicates the format of the data unit as very high throughput (VHT), the scrambler initialization field includes 7 zero bits, and the reserved field includes a reserved zero bit.

11. The method of claim 9, wherein the initial scrambling sequence includes operating channel bandwidth information and a pseudo random integer, the operating channel bandwidth information indicating the operating channel bandwidth.

12. The method of claim 11, wherein the initial scrambling sequence further includes a dynamic bandwidth information indicating whether a dynamic bandwidth operation is supported.

13. The method of claim 12, wherein the operating channel bandwidth information has 2 bits.

14. The method of claim 13, wherein the 2 bits indicates one among 20 MHz, 40 MHz, 80 MHz, contiguous 160 MHz and non-contiguous 80+80 MHz for the operating channel bandwidth.

* * * * *